Dec. 10, 1968    D. E. McGEE    3,415,983
HEADLIGHT ARRANGEMENT FOR VEHICLES
Filed Oct. 17, 1966    3 Sheets-Sheet 1
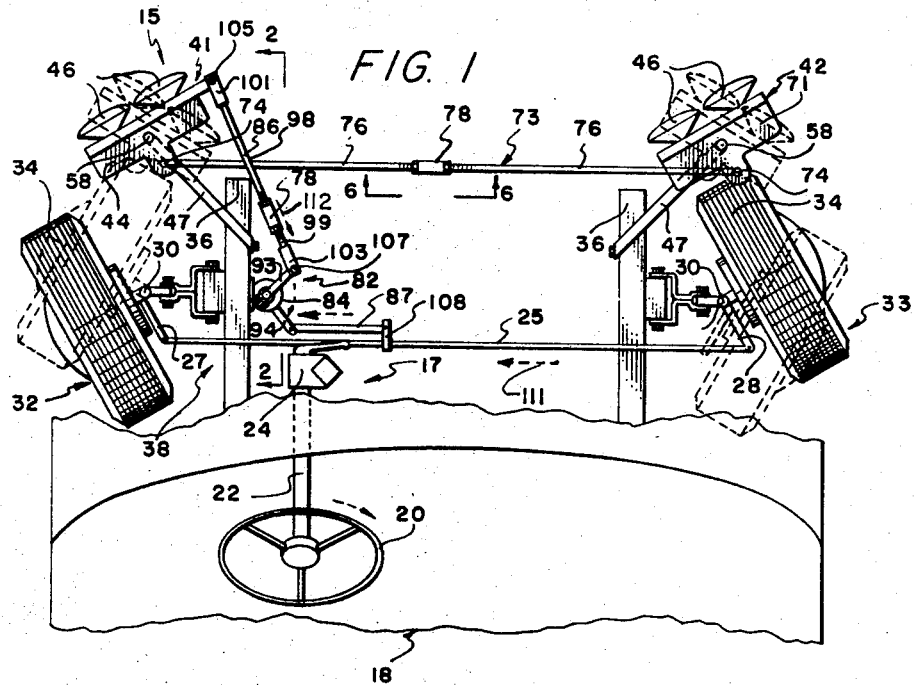
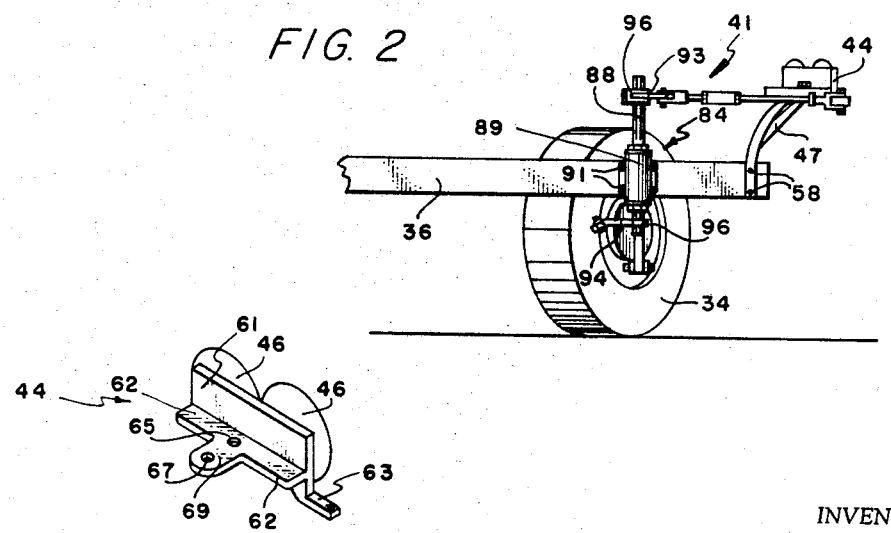
INVENTOR.
DONALD E. McGEE
BY John H. Widdowson
Phillip A. Rein
ATTORNEYS Dec. 10, 1968      D. E. McGEE      3,415,983
HEADLIGHT ARRANGEMENT FOR VEHICLES
Filed Oct. 17, 1966      3 Sheets-Sheet 2

INVENTOR.
DONALD E. McGEE
BY
ATTORNEYS

Dec. 10, 1968  D. E. McGEE  3,415,983
HEADLIGHT ARRANGEMENT FOR VEHICLES
Filed Oct. 17, 1966  3 Sheets-Sheet 3
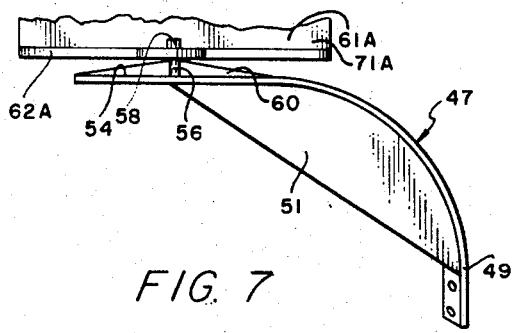
FIG. 7
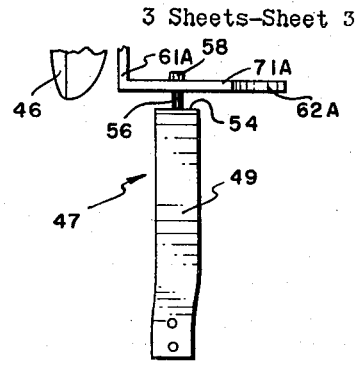
FIG. 8
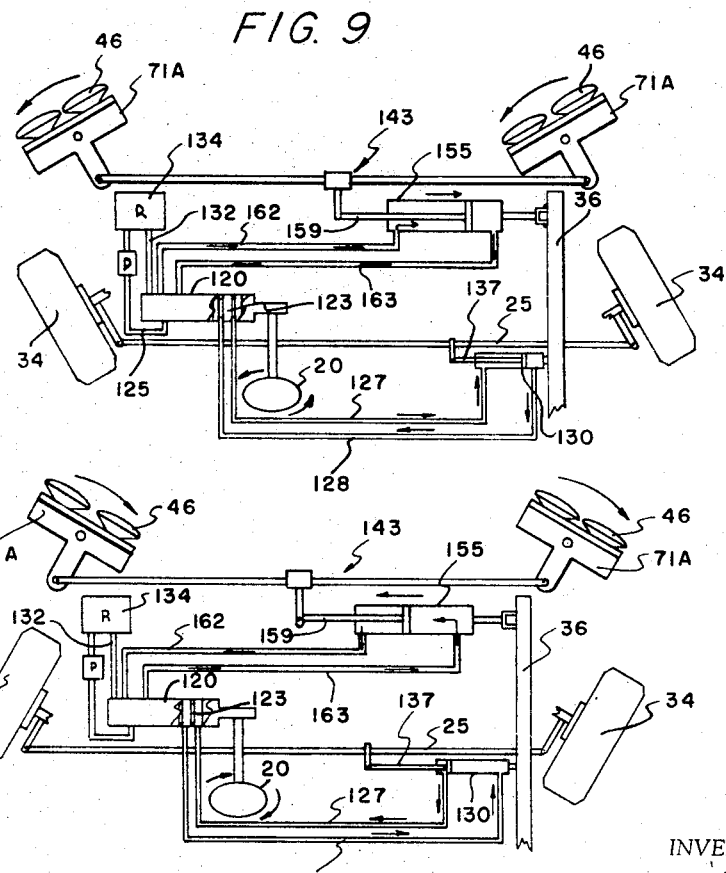
FIG. 9
FIG. 10
INVENTOR.
DONALD E. McGEE
BY
ATTORNEYS

United States Patent Office 3,415,983
Patented Dec. 10, 1968

3,415,983
HEADLIGHT ARRANGEMENT FOR VEHICLES
Donald E. McGee, P.O. Box 3133,
Midland, Tex. 79701
Filed Oct. 17, 1966, Ser. No. 587,307
4 Claims. (Cl. 240—8.25)

ABSTRACT OF THE DISCLOSURE

This device relates to a headlight arrangement for vehicles, and, more particularly, to a headlight arrangement operably connected to the steering mechanism of the vehicle for illuminating the proposed path of travel including support brackets operable to support headlight members thereon connectible to a frame portion of the vehicle, linkage means interconnecting the brackets for conjoint movement thereof, and means connecting one of the brackets to the connector rod of the vehicle whereupon the brackets and headlight members are moved in relation to direction of vehicle travel. Still, more specifically, this device relates to a headlight arrangement operably connected to the steering and front wheel assembly of an automobile operable to maintain headlight members and the front wheels pointed in the same direction at all times. Additionally, this device relates to a hydraulically operated headlight arrangement connected to the power steering mechanism on a vehicle operable to transform turning movement through hydraulic fluid pressure and piston cylinder assemblies to move interconnected headlight members in response to turning movement of the vehicle.

---

Various types of headlight assemblies are known to the prior art having headlight members connected to the steering mechanism of a vehicle so as to rotate the headlight members in conjunction with the turning movement of the front wheels to maintain a lighted area in the direction of vehicle movement. However, the prior art devices are not adaptable to modern vehicles and are limited in maneuverability and operational features. Additionally, the prior art devices fail to disclose headlight assemblies universally mountable on a variety of vehicles having rotatable headlights hydraulically actuated on the turning movement of a conventional steering wheel.

In accordance with the present invention, a new headlight arrangement for vehicles such as trucks, automobiles, etc. is provided which includes a pair of spaced headlight bracket means pivotally connected by support arms to a main frame portion of the supporting vehicle. The bracket means are adapted to support a plurality of headlight members thereon with the bracket means interconnected by a linkage means whereby pivotal movement of one of the bracket means results in a like movement in the other bracket means. The headlight arrangement further includes an idler arm assembly connected to the main frame portion having an upper portion connected to a transfer rod which, in turn, is connected to one of the bracket means. A lower portion of the idler arm assembly is pivotally connected to one end of an arm member having its other end connected to an elongated connector rod. As in a conventional steering mechanism, the connector rod is attached to tire members of the vehicle to control the turning movement thereof. The vehicle includes the conventional mechanism having a steering wheel member connected to an elongated shaft or column through a steering worm assembly to the connector rod whereby rotational movement of the steering wheel member acts through the steering worm assembly to axially move the connector rod and interconnected arm member to rotate the idler arm assembly and move the transfer rod. It is obvious that this results in a conjoint pivotal movement of the interconnected bracket means and the tire members whereby the headlight members are continuously maintained pointed in the same direction as the tire members.

In another embodiment of the headlight arrangement of this invention, the apparatus is usable within a vehicle having a power steering unit whereupon a piston and cylinder assembly is connectable to the main frame including a cylinder having a piston mounted therein for axial movement. The outer end or rod of the piston is connected through an intermediate shaft to the linkage means whereby movement of the piston results in a like movement in the linkage means and pivotal movement of the bracket means about the respective support arms. The piston and cylinder assembly is operably connected to a control valve of the power steering unit whereupon rotation of the steering wheel operates to supply operating pressure to opposite ends of the piston as required so that the turning movement of the tire members by the power steering unit is correspondingly reflected in a pivotal movement of the bracket means so that the headlight members are always pointed in the same direction as the tire members.

In one preferred specific embodiment of the invention, a headlight arrangement is provided for an automotive vehicle that has a conventional steering mechanism consisting of a steering wheel interconnected by a column member through a steering worm to a connector rod having opposite ends operably connected to wheel members. The vehicle further includes means for pivotally mounting the wheel members to a main support frame so that rotational movement of the steering wheel results in an axial movement of the connector rod to pivot the wheel members about their upright supporting pins to control the direction of vehicular movement. The headlight arrangement includes a pair of support and bracket means each having a support arm secured to the main frame of the vehicle with a bracket means pivotally connected to the upper end thereof. The bracket means includes an upright plate portion adapted to support a plurality of headlight members and a laterally extended support plate integral therewith. The bracket means are interconnected by a linkage means having opposite ends thereof pivotally connected to the support plates whereby movement of one of the bracket means result in a like pivotal movement in the other bracket means. The bracket means and the connector rod are operably associated through a transverse rod member connected to a idler arm assembly mounted on the main frame which, in turn, is connected by an arm member to the connector rod. The idler arm assembly includes an upright rotatable shaft mounted within a housing secured to the main frame and having upper and lower laterally extended connector arms. The upper and lower connector arms are connected to the transverse rod and the arm member, respectively, whereby axial movement of the connector rod is transferred through the arm member, idler arm assembly, and the transverse rod to pivot one of the bracket means which results in a like movement through the linkage means of the other bracket means. It is seen, therefore, that the steering wheel is rotatable in either direction to cause pivotal movement of the tire members to change the direction of vehicular movement and conjoint rotational or pivotal movement of the bracket means to thereby maintain the headlight members pointed in the direction of vehicular movement.

In another preferred specific embodiment of the headlight arrangement of this invention, the automotive vehicle is provided with a power steering unit having a steering wheel connected by a conventional column to a control slide valve which is operably connected through a piston and cylinder arrangement to the connector rod to control the direction of vehicular movement. The slide valve is additionally connected in this embodiment to a piston and cylinder assembly mounted on the main frame of the vehicle having an axially movable piston and integral piston rod having its outer end connected to a laterally extended shaft which, in turn, is connected to the linkage means of the second embodiment of the headlight arrangement. The slide valve means is operable on rotational movement of the steering wheel to supply fluid pressure selectively to opposite ends of the piston and piston rod assembly to provide for the axial movement of the piston rod to cause pivotal movement of the bracket means about the respective support arms. It is seen, therefore, that the second embodiment of the headlight arrangement operates in conjunction with a conventional hydraulically actuated control valve of a power steering unit to maintain the direction of tire movement and the headlight members the same.

Accordingly, it is an object of this invention to provide a new and novel headlight arrangement overcoming the above-mentioned disadvantages of the prior art devices.

Another object of this invention is to provide a headlight arrangement readily attachable to conventional automotive vehicles including spaced bracket means adaptable to support a plurality of headlight members operably connected to the steering mechanism of the vehicle to provide for directing the headlight members in the path of proposed vehicular movement.

A further object of this invention is to provide a headlight arrangement for automotive vehicles having an idler arm assembly operable to transfer turning movement of the vehicle into a corresponding movement of a plurality of headlight members to continuously illuminate the path of vehicle movement.

One further object of this invention is to provide a headlight arrangement for automotive vehicles having a piston and cylinder assembly operably connected to a power steering unit of the vehicle to provide for the conjoint pivotal movement of the tire members and the headlight members to maintain the same pointed in the same identical direction.

One further object of this invention is to provide a headlight arrangement for automotive vehicles that is automatic in operation, substantially maintenance free, and dependable in operation with a minimum amount of initial investment.

Various other objects, advantages and features of the invention will become apparent to those skilled in the art from the following discussion, taken in conjunction with the accompanying drawings, in which:

FIG. 1 is a fragmentary top plan view of an automotive vehicle having portions thereof broken away to illustrate a headlight arrangement of this invention;

FIG. 2 is a fragmentary sectional view taken along line 2—2 in FIG. 1;

FIG. 3 is a perspective view of a bracket means of the headlight arrangement of this invention;

FIG. 7 is an enlarged fragmentary elevational view of the support and bracket means of the headlight arrangement of this invention;

FIG. 8 is a side view of the support and bracket means of this invention; and

FIGS. 9 and 10 are schematic diagrams illustrating the operation of the second embodiment of the headlight arrangement of this invention.

Figure 4:
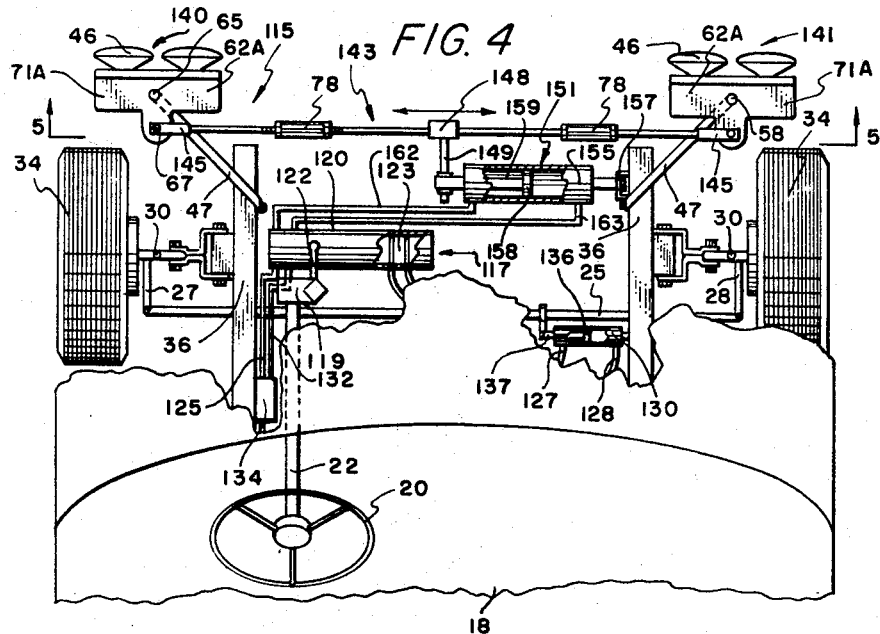
FIG. 4 is a fragmentary top plan view of an automotive vehicle similar to FIG. 1 illustrating a second embodiment of the headlight arrangement of this invention.
Figure 5:
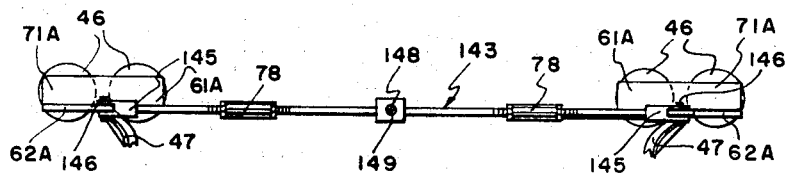
FIG. 5 is a fragmentary sectional view taken along line 5—5 in FIG. 4.

The following is a discussion and description of preferred specific embodiments of the headlight arrangement of this invention, such being made with reference to the drawings, whereupon the same reference numerals are used to indicate the same or similar parts and/or structure. It is to be understood that such discussion and description are not to unduly limit the scope of the invention.

Referring to the drawings in detail, and in particular FIG. 1, the headlight arrangement of this invention, indicated generally at 15, is preferably usable in conjunction with a steering mechanism 17 of a conventional automotive vehicle 18. The steering mechanism or assembly 17 includes a wheel 20 connected through a column 22 to a worm gear assembly 24 operably associated with a connector rod 25. The opposite ends of the connector rod 25 are pivotally connected to rocker arms 27 and 28, respectively, which, in turn, are secured to upright king pins 30 in guide wheel assemblies 32 and 33. The rocker arms 27 and 28 are movable on axial movement of the connector rod 25 to rotate tire members 34 of the guide wheel assemblies 32 and 33 about the respective king pins 30 to control the direction of vehicular movement. The wheel assemblies 32 and 33 are connected to respective channel members 36 of a main frame 38 of the vehicle 18 to vertically support and elevate the same off the ground or road surface. The worm gear assembly 24 operates in a conventional manner to transfer rotational movement of the steering wheel 20 into linear, axial movement of the connector rod 25 to turn or pivot the tire members 34 about the king pins 30 as desired.

The headlight arrangement 15 as viewed in FIG. 1 includes a pair of headlight support means 41 and 42 secured to the forward portions of the main frame 38 and positioned between the wheel assemblies 32 and 33. More specifically, as shown in FIGS. 1 and 2, the headlight support means 41 and 42 are substantially identical and only headlight support means 41 need be described in detail. The headlight support means 41 includes a bracket means 44 adapted to support a pair of headlight members 46 and pivotally connected to a support arm 47 which, in turn, is secured to the respective channel members 36 of the main frame 38. The support arm 47, as shown in FIGS. 7 and 8, has an arcuate main body 49 given rigidity by an integral web section 51 with the lower end of the body 49 connectable as by bolts 53 to the main frame 38. The upper horizontally extended portion 54 of the main body 49 has a stub cylinder 56 thereon adapted to receive a mounting bolt 58 to connect the bracket means 44 as will be explained. The cylinder 56 is given substantial rigidity by a pair of gusset plates 60 secured as by welding thereto and to the adjacent surface of the main body 49. It is obvious that the main body 49 can be curved and angled as desired to place the upper support portion 54 thereof in a proper position for supporting the bracket means 44 and headlight members 46 thereon for proper illumination of a forwardly projected portion of the road surface.

As shown in FIG. 3, the bracket means 44 on the headlight support means 41 includes a vertically extended support plate 61 having a laterally extended attachment plate 62 secured as by welding thereto. The support plate 61 is adapted to receive a pair of the headlight members 46 mounted thereon in, for example, a side-by-side relationship. The support plate 61 has a downwardly depending projection 63 extended laterally and below the attachment plate 62 for reasons to be explained. The attachment plate 62 has a first hole 65 adapted to receive the mounting bolt 58 inserted therethrough and threaded into the stub cylinder 56 of the support arm 47 providing for pivotal movement of the attached bracket means 44 relative thereto. A second hole 67 is provided in a tab portion 69 of the attachment plate 62 for reasons to be explained.

The other headlight support means 42 has an identical support arm 47 with a bracket means 71 rotatably mounted thereon. The only difference of the bracket means 71 over the previously described bracket means 44 is that the support plate 61 is not provided with the projection 63 for obvious reasons.

Figure 6:
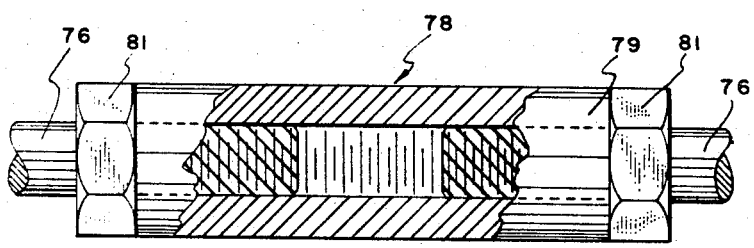
FIG. 6 is an enlarged fragmentary plan view taken along line 6—6 in FIG. 1 having portions broken away for clarity.

The headlight support means 41 and 42 are interconnected for conjoint rotational movement of the bracket means 44 and 71 about the respective mounting bolts 58 by an elongated linkage means 73 having opposite ends connected as by bolts 74 mounted therethrough into the respective second holes 67. The linkage means 73 is constructed of a pair of shaft segments 76 interconnected by an adjustment means 78 (FIG. 6). The adjacent ends of the shaft segments 76 have opposite threads and are mounted within a cylindrical housing 79 of the adjustment means 78 whereby rotation of the housing 79 operates to lengthen or shorten the linkage means 73. Locking nuts 81 are mounted on the shaft segments 76 adjacent the housing 79 and are operable to lock the shaft segments 76 against axial movement when a proper length of the linkage means 73 is achieved. It is obvious that the linkage means 73 operates to correlate the direction of the bracket means 44 and 71 whereby the pivotal movement of one results in a like movement in the other. Adjustment of the linkage means 73 is necessary to align the headlight members 46 so as to cast an illuminating light in the proper direction.

In order to connect the steering mechanism 17 to the headlight support means 41 and 42, a connecting means 82 is provided including an idler arm assembly 84 mounted on a channel 36 of the main frame 38 which is connected to the bracket means 44 by a rod member 86 and to the connector rod 25 by an arm member 87. As shown in FIG. 2, the idler arm assembly 84 includes an upright shaft 88 mounted within an idler housing 89 which, in turn, is secured to the channel 36 as by bolts 91. The shaft 88 is rotatable within the idler housing 89 but held by bearing members (not shown) against axial movement. The upper and lower ends of the shaft 88 have idler arms 93 and 94, respectively, connected thereto as by splines and clamps 96 so as to be selectively rotatable thereon for adjustment. The idler arms 93 and 94 as shown in FIG. 1, are positioned substantially 90 degrees to each other; however, it is obvious that such can be adjusted as required in mounting the headlight arrangement 15 of this invention on a given vehicle.

The rod member 86 consists of first and second segments 98 and 99 having adjacent ends connected to another one of the previously described adjustment means 78 to regulate the overall length thereof. The outer ends of the segments 98 and 99 are provided with U-shaped clamps 101 and 103, respectively. The clamp 101 is mounted about the projection 63 of the bracket means 44 and pivotally connected thereto as by a bolt member 105 and the other clamp 103 is similarly connected to the upper idler arm 93 by a bolt member 107 inserted through aligned holes therein.

The arm member 87 has one end pivotally connected to the lower idler arm 94 with the other end secured to the connector rod 25 as by a clamp member 108. The connection of the clamp member 108 to the arm member 87 permits a limited pivotal movement thereof for reasons to become obvious. It is seen that the arm member 87 presents an offset extension of the connector rod 25 whereby the axial movement thereof results in a substantial like movement of the arm member 87.

In the use and operation of the headlight arrangement 15 of this invention, the headlight support means 41 and 42 are mounted on the vehicle 18 and interconnected to the steering mechanism 17 as shown in FIG. 1. On rotation of the steering wheel 20 clockwise, as viewed in FIG. 1, the tire members 34 are rotatable about the king pins 30 in the same direction to a position as shown in dotted lines to turn the vehicle 18 to the right. This results because of the axial movement of the connector rod 25 through the steering worm assembly 24 as shown by the arrow 111. Concurrently, the shaft 88 of the idler arm 84 is rotated clockwise as viewed in FIG. 1 through the arm member 87 and lower idler arm 94. This rotational motion is transferred to the upper idler arm 93 to move the transverse rod 86 as indicated by arrow 112 to rotate the bracket means 44 clockwise as viewed in FIG. 1. This pivotal movement is transferred through the linkage means 73 to the other bracket means 71 resulting in an identical pivotal movement thereof.

It is seen that the direction of vehicular movement is controllable by the steering mechanism 17 with turning of the tire members 34 being transferred to the headlight support means 41 and 42 so that the headlight members 46 and the tire members 34 are always pointed in the same direction. It is obvious that the length of the idler arms 93 and 94 in conjunction with the distance of the projection 63 to the pivotal center of the stub cylinder 56 are regulated so that rotational movement of tire members 34 results in a corresponding pivotal movement of the bracket means 44 and 71 to assure that they are pointed in the same direction at all increments of turning movement of the vehicle 18.

In a second embodiment of this invention as shown in FIG. 4, a headlight arrangement 115 is provided usable with a power steering unit 117 having the steering wheel 20 and column 22 connected through a worm gear 119 to a control slide valve 120. Rotation of the wheel 20 is transferred by the worm gear 119 to linear movement of a detent 122 to move a valve spool 123 in the slide valve 120 and regulate the flow of pressure fluid from an inlet line 125 through lines 127 and 128 to a power cylinder 130. Return fluid to the slide valve 120 is directed through a line 132 to a reservoir 134. The power steering unit 117 operates in a conventional manner to selectively supply fluid to opposite ends of a piston 136 in the cylinder 130 to move the same and an integral piston rod 137 connected to the connector rod 25. It is seen that this results in turning movement of the tire members 34 as previously described for the first embodiment except hydraulic pressure fluid is used to provide the turning force therefor.

The headlight arrangement 115 includes a pair of headlight support means 140 and 141 having substantially identical bracket means 71A pivotally mounted on the support arms 47 as previously described. A pair of the headlight members 46 are secured to upright support plates 61A, respectively, as previously described with laterally extended attachment plates 62A secured thereto having the first and second holes 65 and 67 therein. A linkage assembly 143 interconnects the bracket means 71A having U-shaped clamp sections 145 at opposite ends mounted about the respective attachment plates 62A and pivotally connected thereto as by bolt members 146 through the first holes 65. In the center of the linkage assembly 143 is a connector clamp 148 having a laterally extended shaft 149 secured to a piston and cylinder assembly 151. Between the connector clamp 148 and opposite ends of the linkage assembly 143 are adjusted means 78 mounted therein to adjust the length of segments 153 of the linkage assembly 143 in the same manner as previously described in use and operation of the other adjustment means 78.

As shown in FIG. 4, the piston and cylinder assembly 151 includes a cylinder 155 pivotally connected as by a bracket 157 to one channel 36 of the main frame 38. A piston 158 slidably mounted in the cylinder 155 has an integral piston rod 159 with the outer end thereof secured to the shaft 149. Pressure fluid is supplied to and returned from the cylinder 155 as by lines 162 and 163 connected to the control slide valve 120. It is obvious that supplying fluid through, for example, the line 162 with exhaust fluid flow back to the reservoir 134 through line 163 results in axial movement of the piston rod 159 and corresponding movement of the linkage assembly 143 and pivotal movement of the bracket means 71a.

In the use and operation of the hydraulic headlight arrangement 115 (FIGS. 9 and 10), on rotation of the steering wheel 20 counterclockwise as viewed in FIG. 9, the detent 122 acts to move the valve spool 123 to direct pressure fluid through lines 127 and 162 into the cylinders 130 and 155, respectively, with exhaust back to the reservoir 134 through the lines 128 and 163. This results in a turning of the tire members 34 through the piston rod 137 and the connector rod 25 to the left or counterclockwise as viewed in FIG. 9 with a corresponding pivotal movement of the bracket means 71A by the piston rod 159 and interconnected linkage assembly 143.

Upon turning the vehicle to the right as shown in FIG. 10, the valve spool 123 moves axially to reverse the direction of pressure fluid flow acting on the pistons 136 and 158, respectively. This results in a clockwise rotation of the tire members 34 and the bracket means 71A as viewed in FIG. 10 to move the headlight members 46 and the tire members 34 so as to be continually pointing in the same direction irregardless of turning movement of the vehicle 18. It is obvious that the lever arms governing pivotal movement of the bracket means 71A and the tire members 34 are regulated in length and synchronized so that the headlight members 46 and tire members 34 are aligned at any increment of turning movement.

It is seen that the headlight arrangements of this invention results in an efficient and effective means of coordinating the placement of illumination on the road surface ahead of a moving vehicle in a proper position for obvious safety reasons. It is seen that this results in a very beneficial safety feature for automotive vehicles as it is obvious that it is much better to see in the direction in which you are moving rather than having the headlight members stationary and illuminating a portion of the road and roadside over which the vehicle is not going to travel.

It will be apparent from the foregoing description of the preferred embodiments of the applicant's headlight arrangements, relatively simple and inexpensive means have been provided which are readily attachable to conventionally available automotive vehicles so as to provide an economical and practical means of providing synchronization of the turning movement of the vehicle with the headlights so that the roadway is always illuminated in the position in which the vehicle is travelling.

While the invention has been described in connection with preferred specific embodiments thereof, it will be understood that this description is intended to illustrate not to limit the scope of the invention, which is defined by the following claims.

I claim:
1. A headlight and steering arrangement adapted for use in a vehicle having a steering means connected to at least one guide wheel through a connector rod for directing the direction of vehicular movement, comprising:
   (a) means for supporting headlight members having support arms secured to a frame portion of the vehicle and bracket pivotally connected to said support arms,
   (b) said brackets having an upright section to support a plurality of the headlight members and laterally extended support sections,
   (c) said support section having portions pivotally connected to said support arms and rearward pivotal portions,
   (d) one of said upright sections having a laterally extended connector projection,
   (e) linkage means connected to said pivotal portions for conjoint pivotal movement of said brackets,
   (f) means connecting the connector rod to said upright sections of said brackets whereby movement of the connector rod and the guide wheel acts to correspondingly rotate said brackets to maintain the headlight members and the guide wheel pointing in the same direction, and
   (g) said connecting means having a rod member connected to said projection, said rod member having an adjustment member mounted therein whereby the distance between said projection and said connector rod can be readily adjusted and the angular alignment of said brackets adjustable simultaneously.

2. A headlight and steering arrangement as described in claim 1, wherein:
   (a) said linkage means having adjustment clamps therein operable to regulate the distance between said brackets whereby the headlight members are adjustable independently so as to be pointing parallel and in the same direction.

3. A headlight and steering arrangement adapted for use in a vehicle having a steering means connected to at least one guide wheel through a connector rod for directing the direction of vehicular movement, comprising:
   (a) means for supporting headlight members having support arms secured to a frame portion of the vehicle and bracket pivotally connected to said support arms,
   (b) said brackets having an upright section to support a plurality of the headlight members and laterally extended support sections,
   (c) said support sections having portions pivotally connected to said support arms and rearward pivotal portions,
   (d) linkage means connected to said pivotal portions for conjoint pivotal movement of said brackets,
   (e) means connecting the connector rod to said brackets whereby movement of the connector rod and the and the guide wheel acts to correspondingly rotate said brackets to maintain the headlight members and the guide wheel pointing in the same direction,
   (f) said connecting means having an idler arm assembly secured to a frame portion of the vehicle, a rod member connected to said idler arm assembly and said upright section, and an arm member connected to said idler arm assembly and the connector rod whereby axial movement of the connector rod is transferred through said idler arm assembly and said rod member to rotate said brackets an amount equal to the turning movement of the guide wheel,
   (g) said idler arm assembly having a rotatable shaft with laterally extended arms secured to respective opposite ends thereof, and
   (h) said arms pivotally connected to said rod member and said arm member whereby rotation of said shaft acts to pivot said brackets proportionately to movement of said shaft member.

4. A headlight and steering arrangement adapted for use in a vehicle having a steering means connected to at least one guide wheel through a connector rod for directing the direction of vehicular movement, comprising:
   (a) means for supporting headlight members having support arms secured to a frame portion of the vehicle and bracket pivotally connected to said support arms,
   (b) said brackets having an upright section to support a plurality of the headlight members and laterally extended support sections,
   (c) said support sections having portions pivotally connected to said support arms and rearward pivotal portions,
   (d) linkage means connected to said pivotal portions for conjoint pivotal movement of said brackets,
   (e) means connecting the connector rod to said bracket having a hydraulic cylinder connected to a frame portion of the vehicle, a piston slidably mounted within said cylinder connected to said linkage means, and fluid supply means connected to said cylinder and the steering wheel operable on turning movement of the guide wheel by the steering wheel to supply fluid to said cylinder and axially move said piston to rotate said bracket means a corresponding amount, and (f) said linkage means having an adjustment member on opposite sides of the connection of said piston whereby relative the rotational position of the headlight members can be adjusted so as to be pointed in the same direction.

References Cited
UNITED STATES PATENTS

| | | | |
|---|---|---|---|
| 1,019,961 | 3/1912 | Hixon | 240—8.25 |
| 1,260,696 | 3/1918 | Master | 240—8.25 |
| 1,656,561 | 1/1928 | Hughes et al. | 240—62.3 |
| 1,702,004 | 2/1929 | Helstrom | 240—61.5 |

NORTON ANSHER, *Primary Examiner.*

WAYNE A. SIVERTSON, *Assistant Examiner.*

U.S. Cl. X.R.

240—62.3